US008051493B2

(12) United States Patent
Ulcinas et al.

(10) Patent No.: US 8,051,493 B2
(45) Date of Patent: Nov. 1, 2011

(54) PROBE MICROSCOPY AND PROBE POSITION MONITORING APPARATUS

(75) Inventors: Arturas Ulcinas, Bristol (GB); John D. Engledew, North Somerset (GB); Michael L. Picco, Bristol (GB); John M. Miles, Bristol (GB); Massimo Antognozzi, Bristol (GB)

(73) Assignee: The University of Bristol, Bristol (GB)

( * ) Notice: Subject to any disclaimer, the term of this patent is extended or adjusted under 35 U.S.C. 154(b) by 89 days.

(21) Appl. No.: 12/595,504

(22) PCT Filed: Apr. 9, 2008

(86) PCT No.: PCT/GB2008/001236
§ 371 (c)(1),
(2), (4) Date: Feb. 2, 2010

(87) PCT Pub. No.: WO2008/122800
PCT Pub. Date: Oct. 16, 2008

(65) Prior Publication Data
US 2010/0207039 A1    Aug. 19, 2010

(30) Foreign Application Priority Data

Apr. 9, 2007  (GB) .................................. 0706732.5
Jul. 4, 2007   (GB) .................................. 0712923.2
Sep. 17, 2007 (GB) .................................. 0718094.6

(51) Int. Cl.
G01N 13/16  (2006.01)
G01B 5/28   (2006.01)
G01Q 60/18  (2010.01)

(52) U.S. Cl. .................. 850/33; 850/6; 850/8; 250/306; 250/307; 73/105

(58) Field of Classification Search .................. 850/6, 8, 850/33; 250/306, 307; 73/105
See application file for complete search history.

(56) References Cited

U.S. PATENT DOCUMENTS 5,509,300 A     4/1996  Chamberlain et al.
5,774,221 A  *  6/1998  Guerra .......................... 356/602
(Continued)

FOREIGN PATENT DOCUMENTS

DE          195 31 466         10/1996
(Continued)

OTHER PUBLICATIONS

Y. Inouye et al., "Near-Field Scanning Optical Microscope With a Metallic Probe Tip," Optics Letters, OSA, Optical Society of America, Washington, DC, US, vol. 19, No. 3, Feb. 1, 1994, pp. 159-161.

(Continued)

Primary Examiner — Nikita Wells
(74) Attorney, Agent, or Firm — Marshall, Gerstein & Borun LLP

(57) ABSTRACT

A method of determining the position of a probe tip. An evanescent electromagnetic field is generated extending beyond an interface boundary between a first medium, having a first refractive index, and a second medium, having a second refractive index which is greater than the first refractive index, the interface boundary extending in a plane. A probe tip is positioned in the evanescent field in the first medium thereby causing propagating electromagnetic radiation to be produced as a result of the disruption of the evanescent field by the probe tip, and at least a portion of the propagating electromagnetic radiation is collected. The spatial intensity distribution of the collected radiation is detected with respect to an image plane. An at least one dimensional position of the probe tip in a probe tip plane is determined from the detected spatial intensity distribution, the probe tip plane being a plane which contains the probe tip and which is substantially parallel to the plane of the interface boundary.

30 Claims, 8 Drawing Sheets

U.S. PATENT DOCUMENTS

| | | | |
|---|---|---|---|
| 6,159,742 | A | 12/2000 | Lieber et al. |
| 7,234,343 | B2 * | 6/2007 | Ducker et al. ................. 73/105 |
| 7,271,574 | B2 * | 9/2007 | Xiang et al. ................. 324/72.5 |
| 2004/0232321 | A1 | 11/2004 | Miles et al. |
| 2006/0005615 | A1 | 1/2006 | Ducker et al. |

FOREIGN PATENT DOCUMENTS

| | | |
|---|---|---|
| EP | 0 795 770 | 9/1997 |
| JP | 2006 090715 | 4/2006 |
| WO | WO/2006/008550 | 1/2006 |

OTHER PUBLICATIONS

D. Courjon et at., "External and Internal Reflection Near Field Microscopy: Experiments and Results", Applied Optics USA, vol. 29, No. 26, Sep. 10, 1990, pp. 3734-3740.

International Search Report for International Application No. PCT/GB2008/001236 mailed Jun. 13, 2008.

International Preliminary Report on Patentability mailed Apr. 2, 2009.

* cited by examiner

FIG. 5A — FIG. 5F

PROBE MICROSCOPY AND PROBE POSITION MONITORING APPARATUS

The present invention relates to probe position monitoring apparatus and to a method thereof which is suitable for use in near field probe microscopy including scanning probe microscopy (SPM). Preferably, but not exclusively, the present invention enables the instantaneous position of the free end of one (or more) substantially vertically arranged probe to be monitored in a plane substantially parallel to a specimen stage ((x,y)-plane). Thus, the present invention is particularly, but not exclusively, suited for measuring forces directed in a plane parallel to the specimen stage (in-plane forces). The present invention also relates to a near-field probe microscopy apparatus and method.

Until now, very small cantilevers have not been intensively developed, in part because the optical lever detection system makes their use in conventional AFM almost impossible. Small cantilevers will in fact not reflect enough light to ensure an acceptable signal-to-noise ratio. Even if a more suitable detection system was employed, a second disadvantage would emerge when using conventional AFM in the study of bio-molecular motors: the geometry of the experiment. Bio-molecular motors tend to produce a linear movement on a substrate (DNA molecules, actin filaments or microtubules). The most direct approach to study these processes requires to stretch the substrate between two points or to adsorb it onto a flat surface. The motor protein is then attached to the force sensor and moved close to the substrate until it starts to do work against the sensor. Because the protein will do work in the direction of the substrate, the geometry of a conventional AFM will require the substrate to be oriented in the vertical direction which is very difficult (if not impossible) to obtain. Alternatively, in plane forces could be measured detecting the twisting of the horizontal AFM cantilever, but the force resolution is several orders of magnitude lower than required.

The use of very small micro-cantilevers in the study of bio-molecular motors could become much more attractive if the cantilevers were oriented perpendicularly to the sample plane (xy-plane) and the microscope was able therefore to detect forces in the x and y directions instead of the vertical direction (z). An AFM with vertically mounted probes (transverse dynamic force microscopy, TDFM) has unique advantages, particularly when imaging bio-molecules using the shear force contrast mechanism. The study of molecular motors is in fact only one case where it is more desirable to study forces that are directed in the xy-plane ("in-plane" force detection). Further examples are: rheology of confined liquids/polymer liquids, surface energy, lubrication, friction, and imaging using non-contact shear force interaction.

Therefore in the case of SPM studies of lubrication, friction and mechanical activity of bio-molecular machines on a surface, one may prefer to study in-plane forces rather than vertical forces. By measuring the instantaneous position of the free end (probe tip) of a vertically mounted probe, the in-plane force can be calculated once the spring constant of the probe is known.

Determining the instantaneous location of the probe tip, with respect to its equilibrium position in the absence of internal or external forces (equilibrium position), is a critical operation when the probe is mounted perpendicularly to the specimen stage. Some examples of detection methods for vertically oriented probes are given in US 1993/005254854A. Conventionally, the deflection of a micro-cantilever in atomic force microscopy (AFM) has been monitored using a laser lever technique in which a beam of light is reflected off the back of the cantilever. As the deflection of the cantilever changes due to an external force, so the position where the reflected light is detected changes. This method is not, though, applicable to vertically oriented cantilevers. With vertical cantilevers typically the z position of the probe free end is extrapolated from the positional adjustments of the cantilever mount.

It is also known to use an evanescent field to monitor the z position of a probe. Thus, as described in US 2006/0005615, the z position of a colloid probe relative to a specimen may be determined by establishing an evanescent field at or extending through the specimen and then collecting, for example using a photomultiplier tube (PMT), propagating light arising from disturbance of the evanescent field by the colloid probe. As the total intensity of the collected propagating light varies with respect to the z position of the probe, once calibrated, the output from the PMT provides an indication of the z position of the colloid probe.

To determine the position of the probe tip with respect to an (x,y) coordinate system connected to the specimen and parallel to the (x,y)-plane, the probe tip's position is calculated on the basis of the probe tip's equilibrium position and the subsequent driven motion of either or both of the specimen stage and the probe in the (x,y)-plane. Piezo-electric translation stages are generally used for fine positional movement of the specimen stage and/or the probe. However, such translation stages may provide only an imprecise determination of actual probe position within the (x,y)-plane due to the non-linearity of their response. Whilst this imprecision can be accommodated by means of closed loop control, for example, at higher speeds, i.e. outside the bandwidth of any feedback system, positional precision can be lost. More importantly, the position of the probe tip cannot be extrapolated from positional information specific to the probe mount because it is affected by the bending of the probe. In the rest of the document, the (x,y) position of the probe tip is measured with respect to the equilibrium position, unless otherwise stated.

Resonant oscillators, such as tuning forks, have also been used for high frequency oscillations of the probe tip for either measurement or scanning purposes. With resonant oscillators, where the instantaneous position of the probe tip is required to be known, this is usually interpolated from the predicted oscillatory motion of the probe in combination with drive data from the translation stages.

In the case of a scanning near-field optical microscope (SNOM), such as that described in WO9612206, a tapered optical fiber is arranged parallel to the z direction in order to collect light reflected from, generated by or transmitted through a specimen. Shear force microscopy is commonly combined with SNOM in order to maintain a constant probe-specimen separation but this requires the tip of the optical fiber, otherwise referred to herein as a glass probe, to be oscillated either substantially parallel to the specimen surface/stage or orthogonal to the specimen surface and so accurate measurement of the (x,y) position of the tip of the optical fiber can be difficult; more so because of the cylindrical cross-section of the optical fiber.

A method for monitoring the position of an oscillating cylindrical glass probe is described in an article by M Antognozzi, H Haschke and M J Miles entitled "A new method to measure the oscillation of a cylindrical cantilever: "The laser reflection detection system", which appeared in Review of Scientific Instruments vol. 71, No. 4 (April 2000). With this technique, a laser beam is focused on the surface of the cylindrical probe at a distance above the tip and light reflected from the cylindrical probe is recorded using a two-sector photodetector. A system of two orthogonal detection lasers thus enables determination of the (x,y) position of the optical fiber. This optical method still requires the actual position of the probe tip to be extrapolated from the measured position of the optical fiber and also it is not suited when imaging in liquid.

A method of measuring the position of microscopic particles in three dimensions involving the illumination of the particles in a focused laser beam and then using the interference of scattered and non-scattered light incident on a quadrant photodiode to determine the positions of the particles, is described in a technical article by Pralle, A., et al., "*Three-dimensional high-resolution particle tracking for optical tweezers by forward scattered light*" which appeared in Microscopy Research and Technique, 1999. 44(5): p. 378-386, the contents of which is incorporated herein by reference.

A first aspect of the present invention strives to overcome the problems encountered when measuring the position of a probe tip in the (x,y)-plane by providing probe position monitoring apparatus and a method thereof which enable direct measurement of the instantaneous position of a probe tip in one or two dimensions of the (x,y)-plane. Furthermore, the present invention aims to provide an apparatus and method for monitoring the free end of a vertically mounted microscale cantilever such as AFM cantilever. In this case the probe tip is the free end of the cantilever and not the tip perpendicular to the cantilever, as conventionally used in AFM. Moreover, the present invention seeks to provide an apparatus and method for monitoring probe tip position which is particularly suited for working in liquid.

According to a first aspect of the present invention there is provided a method of determining a position of a probe tip comprising:

generating an evanescent electromagnetic field extending beyond an interface boundary between a first medium, having a first refractive index, and a second medium, having a second refractive index which is greater than the first refractive index, the interface boundary extending in a plane;

positioning a probe tip in the evanescent field in the first medium and thereby causing propagating electromagnetic radiation to be produced as a result of the disruption of the evanescent field by the probe tip;

collecting at least a portion of the propagating electromagnetic radiation;

detecting the spatial intensity distribution of the collected electromagnetic radiation with respect to an image plane; and determining from the detected spatial intensity distribution an at least one dimensional position of the probe in a probe tip plane, the probe tip plane being a plane which contains the probe tip and which is substantially parallel to the plane of the interface boundary.

Ideally, the image plane is a conjugate of the probe tip plane and the collected propagating radiation is projected onto the image plane so as to retain information on the spatial distribution of the propagating electromagnetic radiation.

In a preferred embodiment the collected propagating radiation is magnified before being detected.

An approximate spatial intensity distribution of the projected electromagnetic radiation may be detected by a spatially discriminating detector such as a multi-sector detector or a pixelated detector.

Ideally, the evanescent field is generated in the first medium by directing an excitation beam of radiation at the interface boundary through the second medium at an angle greater than the critical angle for total internal reflection and the excitation beam of radiation is ideally a coherent light beam.

In one embodiment a portion of the coherent excitation beam of radiation is combined with the collected propagating radiation or alternatively at least a portion of the excitation beam of radiation, after reflection at the interface boundary, (reflected beam of radiation) is combined with the collected propagating radiation.

In a further preferred embodiment the separation of the probe tip from the plane of the interface boundary may be additionally determined from the total intensity of the detected collected propagating radiation after combination with at least a portion of the excitation beam of radiation, optionally after reflection at the interface boundary.

Relative movement of the probe and the first and second media in a direction substantially parallel to the plane of the interface boundary may be performed. For instance the probe may be moved relative to the first medium and the second medium and a detector tracks the movement of the probe.

The positions of the probe tips in a common probe tip plane of a plurality of probes in an array may be determined.

According to a further aspect of the present invention there is provided probe position monitoring apparatus for determining the position of a probe tip, comprising a sample support for defining an interface boundary between a first medium, having a first refractive index and a second medium, having a second refractive index which is greater than the first refractive index, the interface boundary extending in a plane; excitation means for generating an evanescent electromagnetic field extending beyond said interface boundary in the first medium; radiation collection means for collecting at least a portion of the propagating electromagnetic radiation arising from disruption of the evanescent field by the presence of the probe tip within the evanescent field and for directing the collected propagating electromagnetic radiation onto a detector characterized in that the detector is aligned with an image plane and adapted to detect the spatial intensity distribution of the collected propagating radiation at the image plane; and the probe positioning monitoring apparatus further comprises a processor, in communication with an output of the detector, for determining an at least one dimensional position of the probe tip in a probe tip plane on the basis of the spatial intensity distribution of the detected radiation, the probe tip plane being a plane which contains the probe tip and which is substantially parallel to the plane of the interface boundary.

Ideally, the image plane is a conjugate of the probe tip plane and the radiation collection means is adapted to project the collected propagating radiation onto the image plane so as to retain information on the spatial distribution of the propagating electromagnetic radiation.

In a preferred embodiment the apparatus further comprising magnifying means for magnifying the collected propagating radiation before being incident on the detector.

The detector may be a spatially discriminating detector such as a multi-sector detector (for example, two or four sectors) or a pixelated detector.

Also, the apparatus may further comprise an optical system (e.g. of lenses and mirrors) to direct an excitation beam at the interface boundary through the second medium at an angle greater than the critical angle and in a preferred embodiment the excitation beam of radiation is a coherent light beam.

In a further preferred embodiment the apparatus may further comprise optical means for combining a portion of the excitation beam with the collected propagating radiation or may further comprise optical means for combining at least a portion of the excitation beam after reflection at the interface boundary with the collected propagating radiation.

Ideally, the processor is adapted to determine from the total intensity of the detected collected propagating radiation, after combination with at least a portion of the excitation beam of radiation or at least a portion of the reflected excitation beam, the separation of the probe tip from the plane of the interface boundary.

Moreover the apparatus may further comprise scanning means for relative movement of the probe and the first and second media in a direction substantially parallel to the plane of the interface boundary. The scanning means may be coupled to the probe for moving the probe relative to the first medium and the second medium and the detector may be adapted to track the movement of the probe.

In a preferred embodiment the apparatus further comprises oscillation means for relative oscillation of the probe and the first and second media.

In a further aspect of the present invention there is provided a method of simultaneously determining the position of multiple probe tips in a common probe tip plane substantially parallel to the plane of the interface boundary using the method described above.

In still a further aspect of the present invention there is provided probe position monitoring apparatus including the apparatus described above for determining the position of multiple probe tips in a common probe tip plane in which the probes are mounted substantially parallel to each other and arranged in an array.

In a preferred embodiment the collected propagating radiation from the presence of multiple probe tips in the evanescent field is detected with a CCD camera with selectable regions of interest (ROI). Computer software, able to calculate the spatial intensity distribution of each ROI, is used to determine the (x,y) position in the probe tip plane of each individual probe tip in real-time.

In a further aspect the present invention provides a near-field probe microscopy method for collecting sample data, the microscopy method comprising: providing a sample on a sample stage; generating an evanescent field extending beyond an interface boundary between a first medium, having a first refractive index, and a second medium, having a second refractive index which is greater than the first refractive index, the interface boundary extending in the plane of the sample stage; positioning the probe tip of a probe in the evanescent field in a near-field region above the sample surface; and monitoring the position of the probe tip using the method described above to generate probe tip position data whereby a change in probe tip position data is representative of a characteristic of the sample.

Preferably, the method includes changing at least once the relative position of the sample and the probe tip in the probe tip plane to a new relative position; and generating new probe tip position data for each new relative position.

In a preferred embodiment of this aspect the near-field probe microscopy method further comprises moving the probe relative to the sample and tracking the movement of the probe tip to maintain the collected propagating radiation incident on the detector.

In a still further aspect the present invention provides near-field probe microscopy apparatus comprising a sample stage, a probe, and the probe position monitoring apparatus as described above.

Preferably the near-field microscopy apparatus further comprises tracking means for tracking the movement of the probe relative to the sample to maintain the collected propagating radiation incident on the detector.

In a further aspect the present invention provides a method of patterning the surface of a sample comprising the steps of:
providing a sample on a sample stage;
generating an evanescent electromagnetic field extending beyond an interface boundary between a first medium, having a first refractive index, and a second medium, having a second refractive index which is greater than the first refractive index, the interface boundary extending in the plane of the sample stage;
positioning the probe tip of a probe in the evanescent electromagnetic field in a near-field region above the sample surface in a first probe position relative to the sample;
monitoring the position of the probe tip using the method described above to generate probe tip position data;
changing a characteristic of the surface of the sample locally by means of the probe tip;
causing relative movement of the probe and the sample to at least one new probe position and selectively changing a characteristic of the surface of the sample locally at each new probe position so as to producing patterning of the surface of the sample.

Also, the present invention provides near-field microscopy apparatus comprising a sample stage, a probe and probe control means for apply patterning to a sample by means of the probe, the near-field microscopy apparatus further comprising probe position monitoring apparatus as described above.

It will, of course, be appreciated that the interface boundary may be irregular in which case the plane of the interface boundary is an approximation of the interface boundary.

Preferably the probe is sufficiently small and soft and the probe position monitoring apparatus is sufficiently sensitive to enable a force on the probe tip which is lower than 1 pN to generate a change in the probe tip position data with a settling time lower than 1 ms, and/or the probe is less than 1 μm long and/or wide and/or thick.

Typically the probe has a resonant frequency in air which is greater than 20 kHz, preferably greater than 1 MHz, and more preferably greater than 10 MHz.

Typically the method further comprises causing the probe to flex at a frequency greater than 20 kHz, preferably greater than 1 MHz, and more preferably greater than 10 MHz, typically in a direction which is substantially parallel to the sample surface.

Preferably the probe is sufficiently small and soft and the probe position monitoring apparatus is sufficiently sensitive to detect a force on the probe tip which is lower than 0.5 pN.

Preferably the probe is sufficiently small and soft and the probe position monitoring apparatus is sufficiently sensitive to enable a settling time lower than 0.5 ms, and most preferably lower than 0.1 ms.

Typically the probe has a spring constant less than 10 pN/nm, and most preferably less than 1 pN/nm.

The probe may comprise a microfabricated probe, or a carbon nanotube.

Typically the probe is elongate, and the length of the probe is oriented at an angle to the sample surface between 45° and 90°. Typically the length of the probe is oriented at an angle to the sample surface between 85° and 90°.

Embodiments of the present invention will now be described, by way of example only, with reference to the accompanying drawings in which:

FIG. 5 is a table illustrating the operating modes of a near-field probe microscope when operating using the position monitoring system of the present invention;

PROBE POSITION MONITORING APPARATUS

Figure 1:
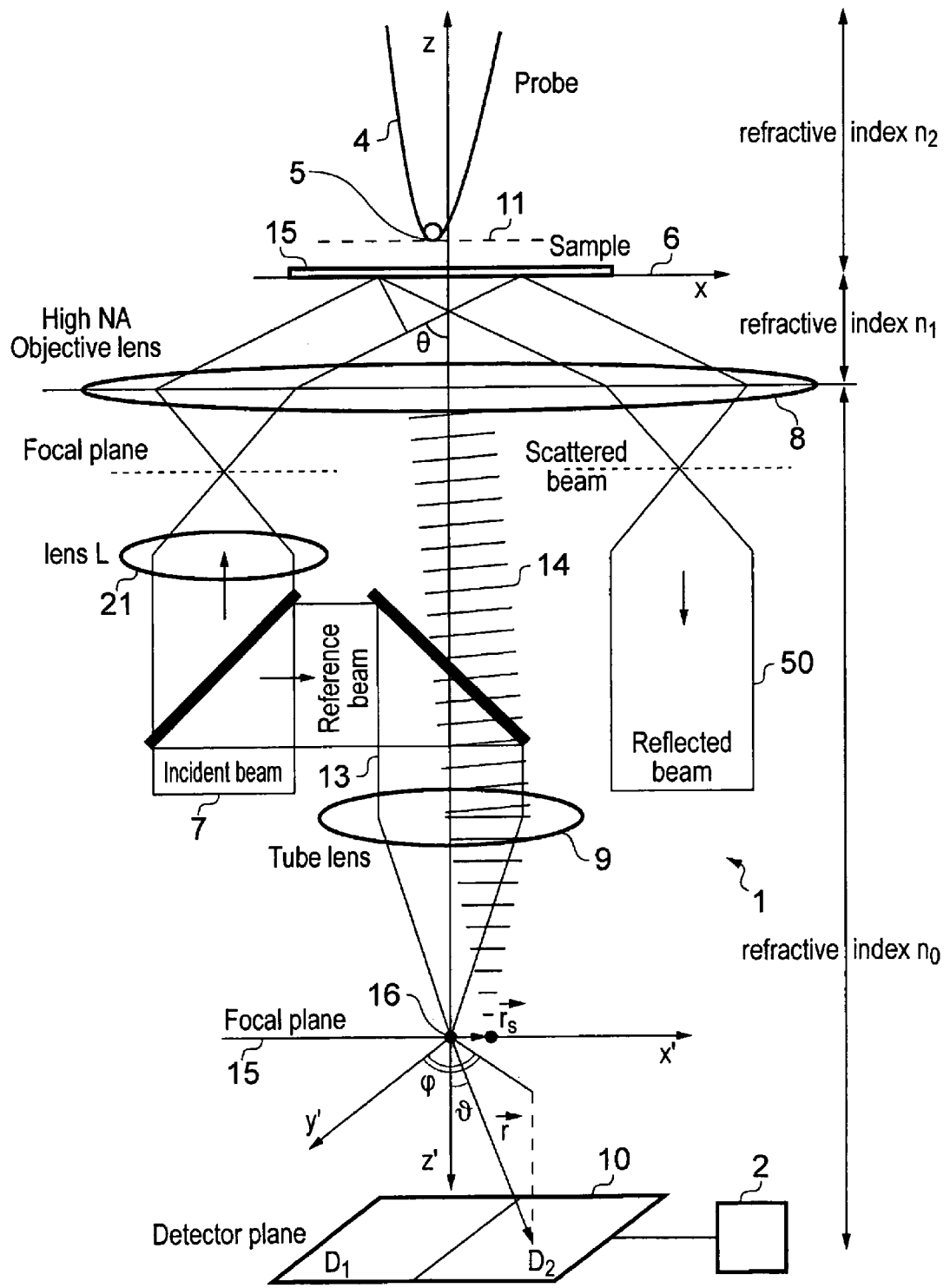
FIG. 1 is a schematic illustration of a probe position monitoring apparatus in accordance with the present invention.

FIG. 1 schematically illustrates probe position monitoring apparatus 1. The probe position monitoring apparatus 1 generally comprises a probe 4 having a tip 5 which is movable relative to a boundary plane 6 that is a plane parallel to the (x,y)-plane. The probe 4 is arranged vertically (aligned with the z direction) and orthogonal to the boundary plane 6 ((x, y)-plane). A probe support (not shown) is provided to hold the probe 4 and to move the probe tip 5 in the space immediately above the boundary plane 6. Also, with this embodiment the probe support is mounted on an oscillator (not shown) to enable a high frequency oscillation to be applied to the probe tip 5. The probe position monitoring apparatus 1 additionally includes data collection means 2 for collecting and analyzing data on the interaction of the probe tip with the sample for the purposes of extracting information on one or more characteristics of the sample.

It is well known that when an electromagnetic wave is totally internally reflected within one medium (with refractive index n1) at a media boundary with another medium of lower refractive index (n2), then on the other side of the boundary, in the lower refractive index medium n2, a non-propagating electromagnetic field is generated in which the strength of the field decays exponentially with respect to the distance from the interface. This non-propagating electromagnetic field is known as an evanescent field or evanescent wave which exists beyond the total internal reflection medium n1. In FIG. 1, such an evanescent field is employed with the probe position monitoring apparatus 1 to directly determine the location of the probe tip 5.

Thus, the probe position monitoring apparatus 1 includes a light source (not shown), such as a laser, which acts as the excitation source of an incident beam 7 for the evanescent field. The excitation source (not shown in FIG. 1) is selected so as to have a wavelength or range of wavelengths which correspond to the wavelengths at which medium n1 is substantially transparent or at least substantially transmissive. Moreover, the probe position monitoring apparatus 1 includes a sample support which is adapted to enable the sample to be in contact with the interface boundary 6; to be illuminated from below by the incident beam 7, with no or minor interference with the evanescent electromagnetic field 3; and for the sample to be provided with an overlying layer of a lower refractive index medium n2, optionally a liquid. In this way, the boundary plane 6, for the purposes of generating an evanescent field, arises at the uppermost surface of the high refractive index regions (bigger than or equal to n1) and the evanescent field extends away from this interface 6 into the lower refractive medium. This interface defines a boundary plane for the purposes of locating the probe tip position.

The probe monitoring apparatus 1 is based on the principle that propagating electromagnetic radiation is generated when a non-propagating evanescent field is disrupted by the presence of an object, namely the probe tip 5, and that the spatial distribution of the propagating radiation enables the position of the probe tip to be directly determined. In other words, the probe tip causes scattering or diffraction of the evanescent wave which enables the position of the source of that scattering or diffraction, i.e. the probe tip, to be identified in the probe tip plane 11. As illustrated, the probe tip plane 11 is parallel to the boundary plane 6 and intercepts the probe tip 5. That is to say, the position of the probe tip is detected and is not extrapolated from position information pertaining to another part of the probe and is not interpolated from a theoretical analysis of the probe system.

Hence, the probe monitoring apparatus 1 further includes a collector 8 (such as a high numerical aperture objective lens) for collecting at least some, preferably all, of the propagating radiation produced as a result of the evanescent field being disrupted by the probe tip. The probe position monitoring apparatus 1 also includes a projection and magnification device 9 (such as a tube lens and a beam expander) to produce a magnified real image of the scattering probe tip 5 onto an image plane, which is ideally a conjugate of the probe tip plane 11. The collector 8 and the projection and magnification device 9 maintain information on the spatial distribution of the collected propagating radiation. They are positioned on the other side of the boundary plane 6 with respect to the probe tip and arranged to direct the collected propagating radiation onto a spatially discriminating detector 10, such as a two or four sector photodetector or a pixelated detector. The active area of the detector 10 is positioned on the image plane which is a conjugate plane with the probe tip plane 11. The output of the detector 10 is in communication with a processor 2 which is programmed to determine, from the spatial intensity distribution of collected propagating radiation detected by the detector 10, at least a one dimensional position of the probe tip in the plane 11.

Near-Field Probe Microscope (Apparatus)

Figure 2:
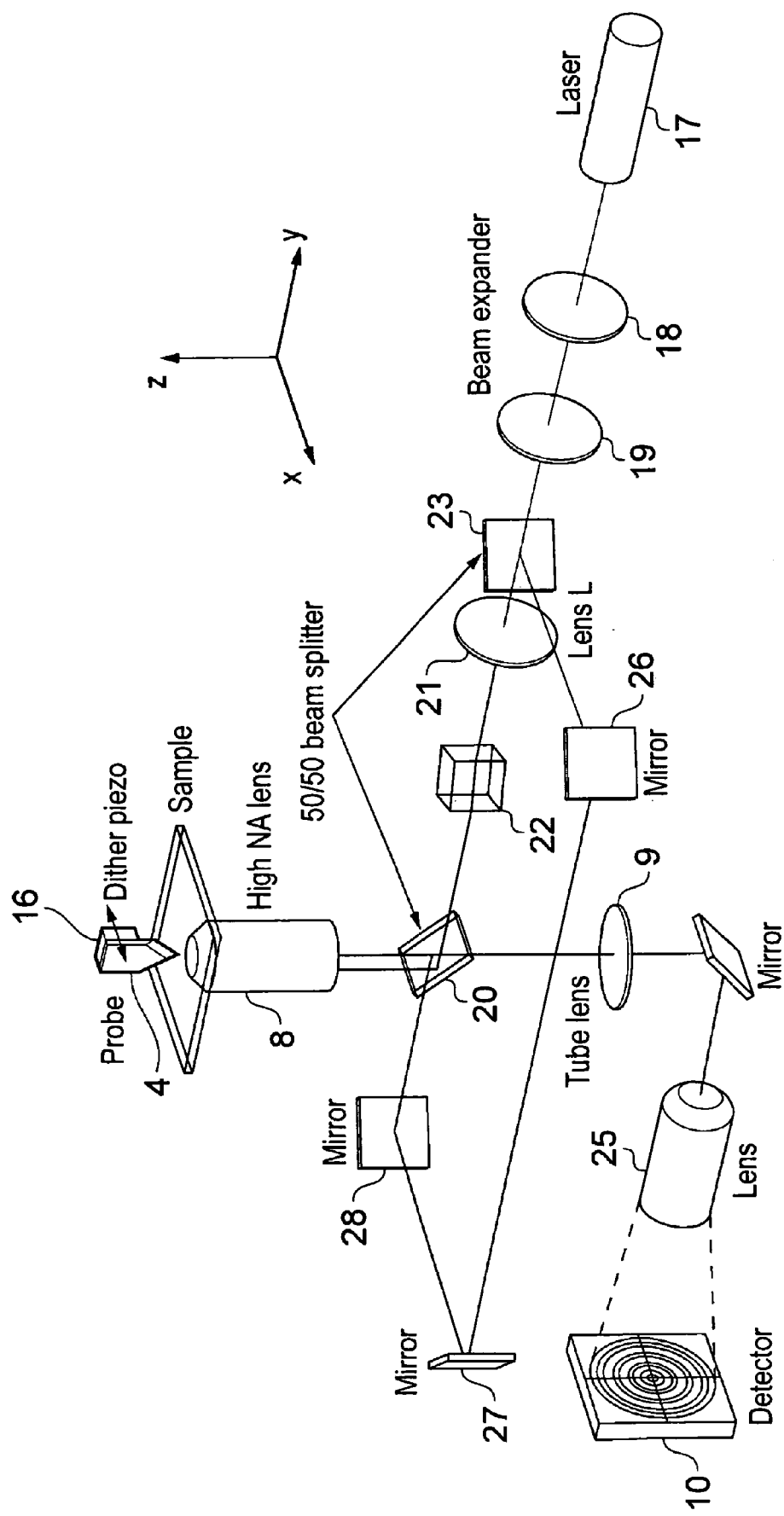
FIG. 2 is a schematic illustration of a near-field probe microscope incorporating probe position monitoring apparatus, in accordance with the present invention.

FIG. 2 illustrates a possible way in which the probe position monitoring apparatus, described in general terms in FIG. 1, can be actually implemented in a near-field probe microscope. The embodiment of FIG. 2 combines the use of a vertically mounted cantilever 4 which is, thus, correctly oriented to measure in plane forces with a probe position monitoring apparatus in accordance with the present invention. The near-field probe microscope illustrated in FIG. 2 introduces the ability to detect the tip of the cantilever/probe thereby avoiding the errors inherent in extrapolating tip position from the measured position of a different part of the cantilever. In the embodiment illustrated in FIG. 2, it is made clear that a very small cantilever 4 can be used as a force sensor (or actuator) with sub-picoNewton and sub millisecond resolution (first resonant frequency bigger than 1 kHz). The probe position monitoring apparatus described herein enables in fact the use of very small cantilevers with no added difficulty. These cantilevers could have all three dimensions (length, width and thickness) smaller than 1 micron and, presently, cannot be detected by commercial atomic force microscopes. Small cantilevers are the basic requirements for high speed AFM imaging and for the mechanical characterization of bio-molecular structures.

In turn, the probe support is mounted on a probe position controller for example in the form of one or more conventional actuators or translation stages (not shown) which provide independent, controllable movement of the probe tip in all three directions. The sample position can also be controlled using an actuator or translation stage (also not shown).

The incident beam is produced by using a beam expander 18,19 to expand by 10 times a laser beam (Nd-Yag 532 nm, 30 mW from Coherent) from a laser 17. The expanded beam is focused by a lens 21 onto the back focal plane of the lens 8 (Nikon 1.49 NA, 100× magnification, infinity corrected). A glass cube 22 after lens 21 is used to translate the laser beam with respect to the optical axis of the lens 8 and in this way obtaining total internal reflection at the sample surface. The evanescent field occupies a circular area of 25 µm in diameter at the sample plane. The vertical position of the probe is controlled using a piezo-stack (P-239 from Physik Instrumente, Germany) not shown in FIG. 2. When the probe tip enters the evanescent field, it scatters the light and the image of the tip is projected onto a four-sector photodetector 10, after passing through the tube lens 9 (10× magnification) and a further 100× objective lens 25. Note that this lens 25 is not shown in FIG. 1. The effect of this lens 25 is only to adjust the size of the diffraction pattern in order to match the detector's area.

To increase the sensitivity of the detection system, 50% of the parallel laser beam exiting the beam expander 18,19 is realigned with the optical axis of the tube lens 8 by a series of mirrors 26-28 and 50/50 beam splitters 20, 23 and interferes with the scattered light from the probe tip at the image plane of the tube lens 9. The interference pattern is projected by the second objective lens 25 onto the detector plane.

The intensity of the evanescent wave above the sample can be measured by collecting the scattered light from the free end of a tipless tapping mode cantilever at different tip-sample separations.

To calibrate the detection system a nanometer-size displacement can be applied in the x (or y) direction using a dither piezo 16 shown in FIG. 2 and the corresponding detector signal recorded.

The (x,y) position of the probe tip is determined by detecting, with the segmented photo-detector 10, the spatial intensity distribution of the propagating electromagnetic radiation arising from disruption of the evanescent field. The (x,y) spatial resolution of the probe tip position relies on the optical magnification of the objective lens combined with the tube lens and the intensity of the laser beam 7. The embodiment described in FIG. 2 has a spatial resolution of 1 nm. The time resolution is controlled by the electronics in the detector 10 and subsequent processing electronics 2, and is in the MHz regime. With this near-field probe microscope, deflection of the probe tip away from an equilibrium position is detected using the probe position monitoring apparatus and this change in the probe tip position is representative of a characteristic of the sample.

The vertically oriented probe can be transversally oscillated at its first resonant frequency, the detection system used to measure the oscillation amplitude, while a feedback loop adjusts the tip-sample separation in order to maintain a constant shear force interaction. In the configuration described in FIG. 2 the tip-sample separation is controlled by moving the probe while the sample is translated in the conventional raster scan. A suitable scanning stage is the xy-stage P-734.2CL from Physik Intrumente.

Theory

The theory underlying the detection system requires the calculation of the scattered intensity of an evanescent wave by the free end of the force sensor and the interference of these spherical waves with a reference laser beam. In this discussion it is assumed that the geometry of the system is similar to the experimental set-up described in FIG. 1. A laser beam (incident beam) with wavelength (in vacuum) $\lambda$ travels upwards into the objective lens 8 and reaches the glass/air (or glass/water) interface 6 at an angle $\theta$ greater than the critical angle, and an evanescent em-field (transmitted beam) is generated above the glass/air (or glass/water) interface 6.

The electric field above the interface is non-propagating and decays exponentially with distance above the surface with a decay length, $\delta$, given by:

$$\delta = \frac{1}{k_z}; \qquad (1)$$

where $k_z$ is the modulus of the complex component of the wave vector in the direction perpendicular to the interface (z) and is given by:

$$k_z = k_2 \sqrt{\left(\frac{n_1}{n_2}\sin\theta\right)^2 - 1}; \qquad (2)$$

with $k_2 = 2\pi n_2/\lambda$ the wave number of the transmitted beam, $n_1$ is the refractive index of the medium (glass) containing the incident laser beam and $n_2$ is the refractive index of the medium (air or water) where the evanescent field is created. If the direction of the incident beam is contained in the xz-plane, as shown in FIG. 1, the evanescent field will have a phase component depending on the x-position, according to equation (3).

$$\phi(x) = \frac{n_1}{n_2} k_2 \sin(\theta) x; \qquad (3)$$

The evanescent electric field will therefore depend on the distance from the interface and on the position along the x-axis as shown in the following equation:

$$\hat{E}(x,z) = E_0 \exp(-k_z z + i\phi(x)); \qquad (4)$$

with $E_0$ the electric field at z=x=0. The phase of the evanescent field is not varying with y. As shown in FIG. 1, the scattered light 14 from the cantilever tip is first collected with the high numerical aperture objective lens 8 and then refocused by the tube lens 9 in its focal plane. At the same time, part of the parallel incident laser beam is redirected and recombined with the scattered light 14 exiting the high NA lens. This second beam 13 is parallel and coaxial with the tube lens and it will also be focused in the focal plane 15 of the tube lens 9. This point 16 defines the origin of a reference system x'y'z' ($\vec{r}=0$) and the two spherical waves propagating out of the focal plane 15 will be, in the far field ($\vec{r} \gg \vec{r}_s$), approximated by:

$$E_r(\vec{r}) = A_r f_r(\vartheta, \varphi) \frac{\exp(ikr)}{kr}; \quad (5)$$

$$E_s(\vec{r}) = A_s f_s(\vartheta, \varphi) \frac{\exp(ik|\vec{r} - \vec{r}_s|)}{k|\vec{r} - \vec{r}_s|};$$

The subscripts "r" and "s" refer to the reference waves and the scattered waves, respectively. k is the wave number in air and it is given by $k = \pi n_0/\lambda$, with $n_0$ the refractive index of air. r is the modulus of the vector $\vec{r}$ from the origin of the system x'y'z'. The angular function $f(\theta, \phi)$ takes into consideration the Gaussian shape of the beams, whereas the terms $A_r$ and $A_s$ are two complex numbers describing the amplitude of the two waves and their relative phase ($A_j = |A_j| e^{i\xi_j}$, with j=r,s). In particular, the amplitude of $A_s$ is proportional to the amplitude of the electric field calculated in equation (4). The phase of $A_s$ is controlled by equation (3) and, obviously, by the cantilever tip position.

After the tube lens focal plane 15, the two waves interfere in the far field in a direction described by the polar coordinates $(\theta, \phi)$. The objective lens 25 in front of the detector 10 shown in FIG. 2 is not included in the calculation because it does not affect the general solution presented here. The position of the cantilever tip is inferred by the signal detected by the photodetector 10 as shown in FIG. 1. More precisely, the movement of the tip (assumed for simplicity) in the x direction is measured by integrating the intensity of the electric field in a semi-area $D_1$ of the detector and subtracting the integrated intensity of the field in a semi-area $D_2$. In general terms the intensity of the interference is given by:

$$|E|^2 = (E_r + E_s)(E_r + E_s)^* = |E_r|^2 + |E_s|^2 + 2\mathrm{Re}\{E_r E_s^*\}; \quad (6)$$

where the values for $E_r$ and $E_s$ at the detector plane are given by equations (5) and the symbol "*" stands for complex conjugate. The signal produced by the photodetector 10 is given by:

$$S = S_1 - S_2;$$

with:

$$S_j = \int_{D_j} |E_r|^2 d\sigma + \int_{D_j} |E_s|^2 d\sigma + 2 \int_{D_j} \mathrm{Re}\{E_r E_s^*\} d\sigma, \quad (j = 1, 2) \quad (7)$$

The first integral calculates the intensity produced by the reference beam 13; ideally it is the same in $S_1$ and $S_2$ and it does not affect S. The second integral calculates the intensity of the scattered beam 14 and gives rise to the basic signal due to the displacement of the cantilever tip. The third part is due to the interference between the two beams and can be simply rewritten using equations (5):

$$\int_{D_j} \mathrm{Re}\{E_r E_s^*\} d\sigma = \int_{D_j} \mathrm{Re}\{E_r(\vec{r}) E_s^*(\vec{r} - \vec{r}_s)\} d\sigma = \quad (8)$$

$$|A_r||A_s|\mathrm{Re}\left\{ e^{i(\xi_r - \xi_s)} \int_{D_j} f_r(\vartheta, \varphi) f_s^*(\vartheta, \varphi) \frac{e^{ik(r - |\vec{r} - \vec{r}_s|)}}{k^2 r |\vec{r} - \vec{r}_s|} d\sigma \right\}$$

It is clear that any constant multiplying $S_j$ will also multiply S, therefore linearly increasing the detector signal. The simplest way to maximise the signal S requires one to increase the intensity of the reference beam $|A_r|$ (or the scattered beam $|A_s|$). A more effective way to maximise S is to adjust the phase difference between the reference beam and the scattered beam to obtain: $(\xi_r - \xi_s) = 90°$. This is due to the last integral in equation (8), where its real part is symmetric in x' (i.e. across the detector) and therefore does not contribute significantly when computing S. On the other hand, the complex part of this integral is anti-symmetrical in x' and, when combined with a phase difference of $(\xi_r - \xi_s) = 90°$, gives its maximal contribution to $S_j$ and therefore to S.

Figure 3A:
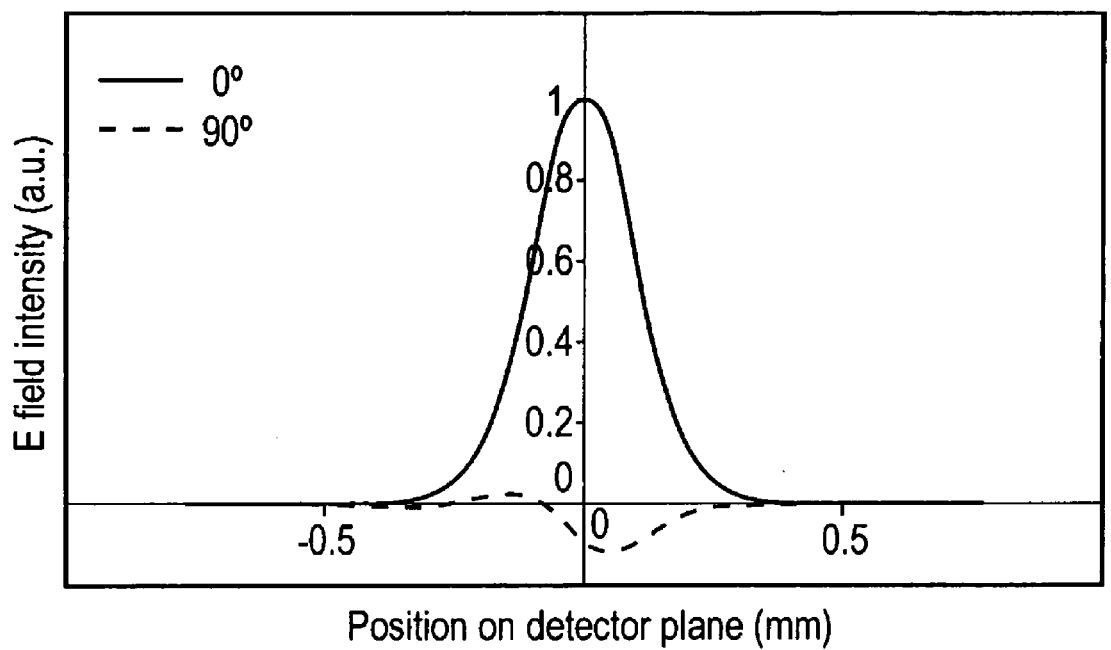
FIG. 3a is a graph of electric field intensity across the detector plane as described in FIG. 1.
Figure 3B:
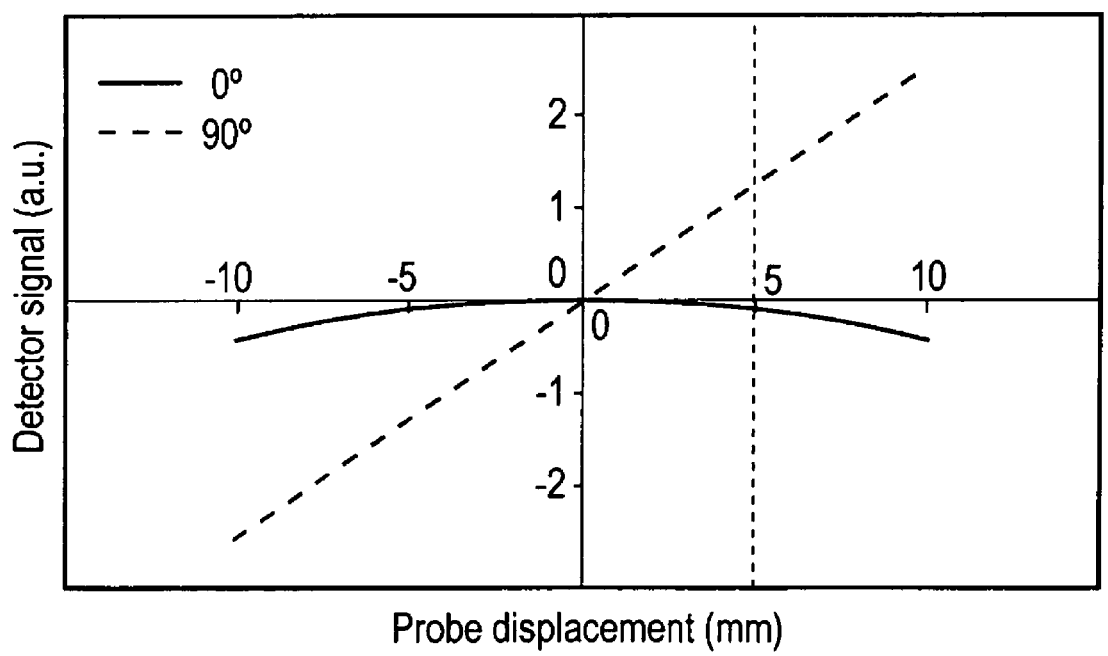
FIG. 3b is a graph of signal produced by the detector as a function of the probe x-position.

A numerical calculation of the interference pattern as a function of the tip position confirms these considerations and it can be used to understand better the effect of the relative phase between the reference and the scattered beam. When the probe is aligned with the optical axis (x=y=0) the two Gaussian beams are concentric and the interference pattern on the detector is symmetric, producing a null signal (S=0). FIG. 3a shows how the intensity of the electric field (calculated using equation (8)) varies across the detector when the probe is displaced by +5 nm from the centre in the x direction. The simulation shown in FIG. 3a considers a laser wavelength of 532 nm, an objective focal length of 2 mm and a numerical aperture of 1.49 and a displacement of the probe in the x-direction of +5 nm from the optical axis. The phase difference is between the reference and the scattered beams and it is calculated when the probe is in the optical axis. The tube lens has a focal length of 180 mm. As predicted, a phase difference of 90°, between the reference and the scattered beams, produces a non-symmetric intensity profile across the detector and results, therefore, in a more intense signal S. A phase difference of 0°, produces a symmetric intensity profile and will not contribute significantly to the signal S. This analysis is confirmed in FIG. 3b where the signal S from the detector is computed (using equation (7)) as a function of the tip position (between −10 nm and 10 nm) for two different phases (0° and 90°). The signal is calculated by integrating the electric field intensity in the two areas of the detector for different tip x-positions. The dashed line highlights the position of the probe used to calculate the two curves in FIG. 3a.

Finally, it should be noted that the present system allows the relative phase between the two Gaussian beams to be adjusted to maximize the signal output. This is performed by translation of one of the mirrors 26-28 that is responsible for steering the reference beam. It is this additional flexibility that sets the detection system described here apart from conventional back focal plane detection used in optical tweezers, that operates at fixed phase.

Results and Analysis

The sensitivity of the SEW detection system 1 was tested by measuring the thermal PSD of a rectangular micro-cantilever. The length and width of the milled cantilever were 68.5 um and 480 nm respectively as measured from the focused ion beam (FIB) image. The thickness of the probe was assumed to be within the range specified for the unmodified OBL cantilever from which it was milled (between 140 nm and 220 nm). The resonant frequency and spring constant were calculated from this knowledge of the dimensions and material properties of the cantilever to be 32.5 kHz and 0.15 pN/nm. The cantilever was mounted vertically and free to oscillate in the x direction (as described in FIG. 2). When lowered into the evanescent field, the end of the cantilever scattered the evanescent field and produced a bright spot on the detector (when the reference laser beam is temporarily stopped). To avoid shear force interaction, care was taken to ensure that the free end of the cantilever was at least 20 nm away from the glass surface. The detection sensitivity (i.e.

calibration constant) was measured at this particular tip-surface distance and the position of the tip was recorded as the cantilever was thermally driven. The procedure was repeated after placing the cantilever in the water, for which special care had to be taken to avoid bending of the cantilever due to the surface tension of water.

Figure 4A:
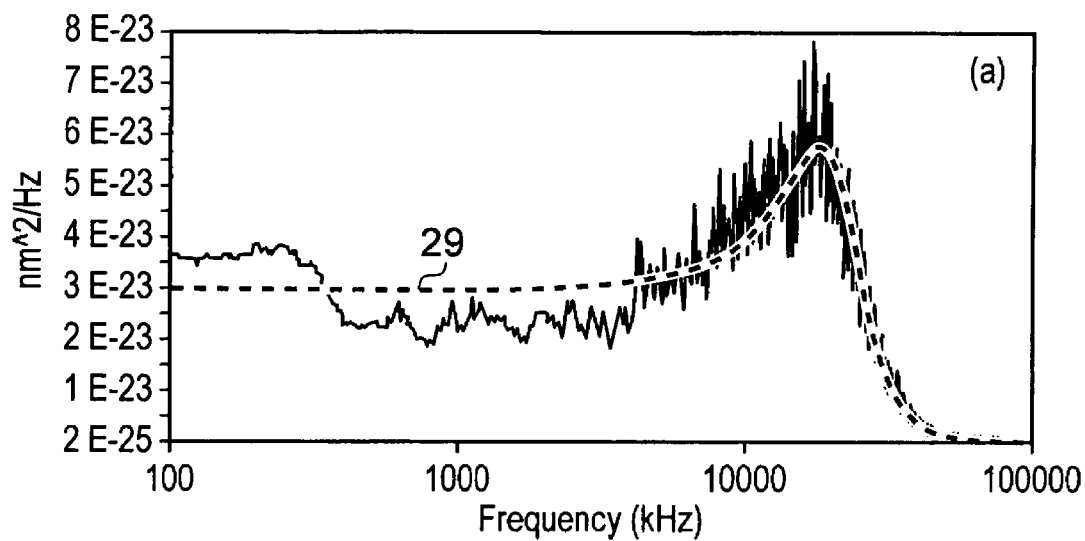
FIG. 4a shows a power spectrum density spectrum calculated after recording the position of a cantilever for a few seconds with a 300 kHz sampling rate in ambient conditions.
Figure 4B:
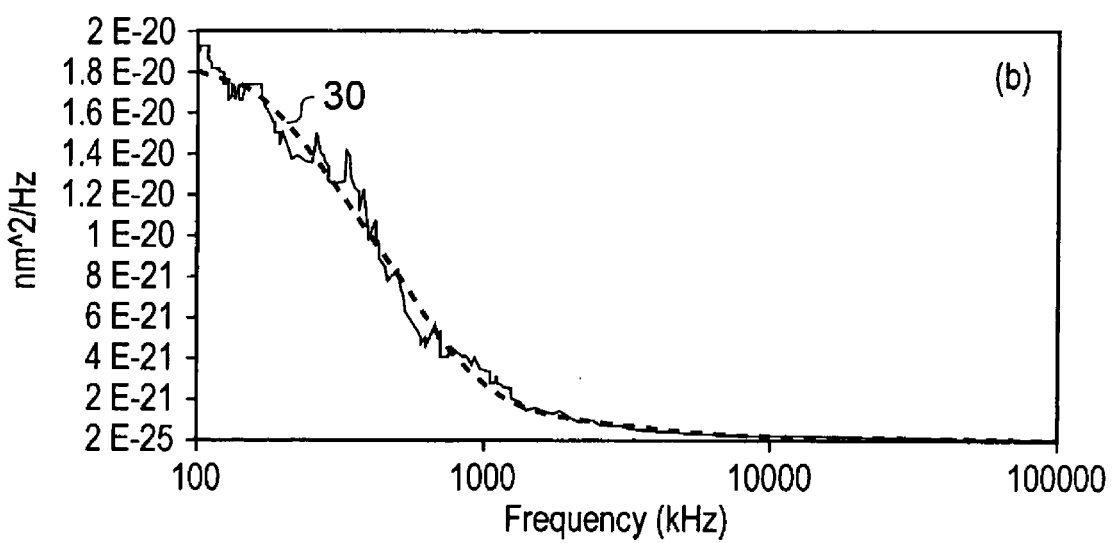
FIG. 4b shows a power spectrum density spectrum calculated after recording the position of a cantilever for a few seconds with a 300 kHz sampling rate and the cantilever immersed in water.

The signal was converted into actual displacement and the PSD was calculated (shown in FIGS. 4a and 4b). The two experimental curves refer to the same cantilever but in different environments: ambient (FIG. 4a) and liquid conditions (FIG. 4b). The lines 29, 30 are fitting curves obtained using equation (9). The quality factor of the cantilever is 1.3 (air) and 0.03 (water) and the spring constant is 0.17 pN/nm. The Lorentzian curve in equation (9) is fitted to the experimental data (in air) to estimate the quality factor Q, the spring constant k and the resonant frequency $v_n$ of the cantilever. Once the spring constant of the cantilever in air is obtained, the fitting of the spectrum in liquid is calculated adjusting only Q and $v_n$.

$$\frac{x^2(v)}{\Delta v} = \frac{2k_B T}{\pi v_n Q k} \frac{1}{\left[1 - \left(\frac{v}{v_n}\right)^2\right]^2 + \left[\frac{v}{v_n Q}\right]^2} \quad (9)$$

The spring constant of the cantilever was measured to be 0.17 pN/nm, these agree well with the calculated values derived from the cantilever's geometry.

Figure 4C:
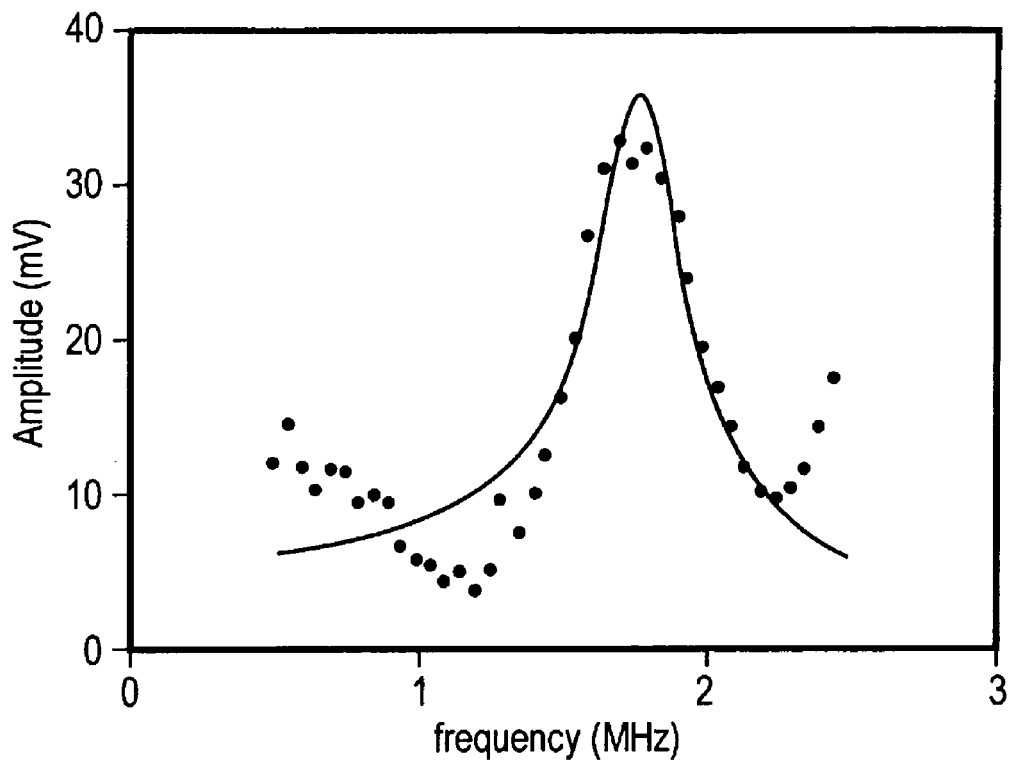
FIG. 4c shows the frequency spectrum in air of a very small cantilever, detected using the SEW detection system. The resonance frequency is 1.8 MHz and the Q factor is ~10 as calculated using the driven harmonic oscillator model (solid line).
Figure 4D:
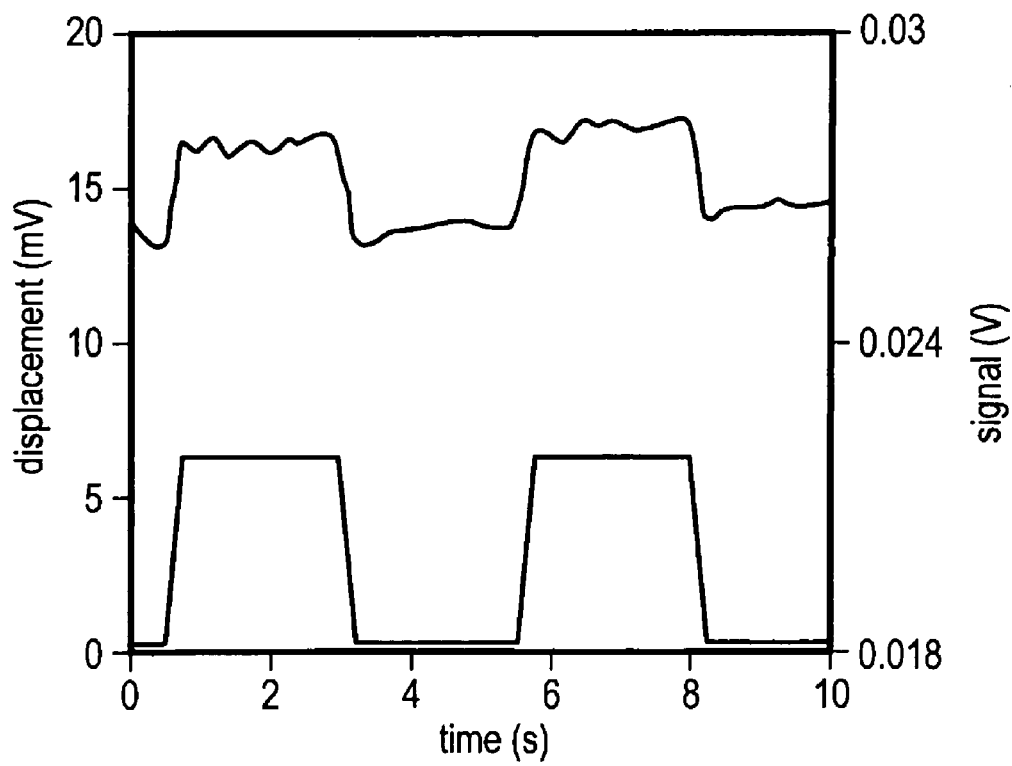
FIG. 4d shows the recorded signal in volts, when a square wave lateral displacement (bottom curve) is applied to the cantilever. The resolution of the SEW detection for this cantilever is ~1 nm.

The final step in the characterization of the SEW detection method was to show the possibility of using a very small cantilever which has a high resonant frequency. FIG. 4c shows the frequency spectrum recorded by driving the cantilever with a sweeping frequency around its first resonance peak (1.8 MHz), while FIG. 4d shows the recorded signal when the cantilever is displaced in the x direction by applying a square voltage wave to the dither piezo 16, resulting in 6 nm steps (peak-to-peak). Both resonant frequency and displacement step are clearly detected, thus confirming that the SEW detection system can resolve the position of the cantilever tip with nanometer resolution. This result is an important landmark in the use of smaller and faster force sensors. At the present, the lack of large scale production of smaller cantilevers is the only obstacle preventing their use in exciting areas such as molecular biology and high-speed SPM imaging.

Alternative Detection Modes

The probe monitoring apparatus illustrated in FIGS. 1 and 2 works by detecting the spatial intensity distribution of the collected propagating radiation after combining the collected propagation radiation with a reference beam 13 of radiation of the same frequency. However, various alternative arrangements are possible in which the apparatus simply detects the spatial intensity distribution of the collected propagating radiation Three related modes of operation are: (1) interference mode with the reflected excitation; (2) interference mode with the excitation source; and (3) direct mode.

In the first mode, the plane waves 14 exiting the collection device 8 are combined with a reflected beam 50 (assuming that the reflected beam 50 is a parallel beam). The interference pattern is then projected onto the detector 10 via the projector device 9.

In the second mode, the plane waves 14 exiting the collection device 8 are combined with the reference beam 13 (assuming that the reference beam 13 is a parallel beam). The interference pattern is then projected onto the detector 10 via the projector device 9.

In the third mode only the plane waves 14 collected by the collection device 8 are projected onto the detector 10 via the projector device 9.

It has been found that the second mode of operation is preferred as it achieves greater sensitivity than the third mode and without the topographic noise which arises with the first mode.

The second mode also offers the opportunity to determine the probe tip position in the z direction. In the second mode of detection the z position of the probe tip is determined as a change in the total intensity of the interference pattern in contrast to the change in simple scattered light described in US2006/0005615. The advantage of the interference mode when measuring the z position of the probe tip is that the probe tip can be detected further away from the interface boundary (around half the wavelength of the excitation source 7) than using the method described in US2006/0005615.

Alternative Microscopy Modes

Although reference has been made herein to the probe being scanned relative to the sample, the near-field probe microscope with probe position monitoring apparatus can support either a scanning sample and/or a scanning probe. In the latter case, the probe monitoring system may additionally include a conventional tracking device to maintain the image of the probe tip in the correct position on the photo-detector 10. For example, for slower tip motion, one or more adjustable reflectors (such as the mirrors in FIG. 2) may be employed to track the probe tip whereas for higher speed tip motion acousto-optic modulators may be employed.

Furthermore, the probe position monitoring system supports both imaging and non-imaging modes. The various operational mode permutations for imaging/non-imaging modes, and static/oscillating probe are illustrated in FIG. 5a-f all of which are supported by the probe position monitoring method described herein. In FIGS. 5a-f the probe position monitoring apparatus in accordance with the present invention is defined TIRM detection.

Note that in all cases the output of the TIRM detection module in FIGS. 5a-5f provides an indication of the position of the probe tip in a direction substantially parallel to the sample surface, and hence is representative of a force on the probe tip in that direction.

Figure 5A:
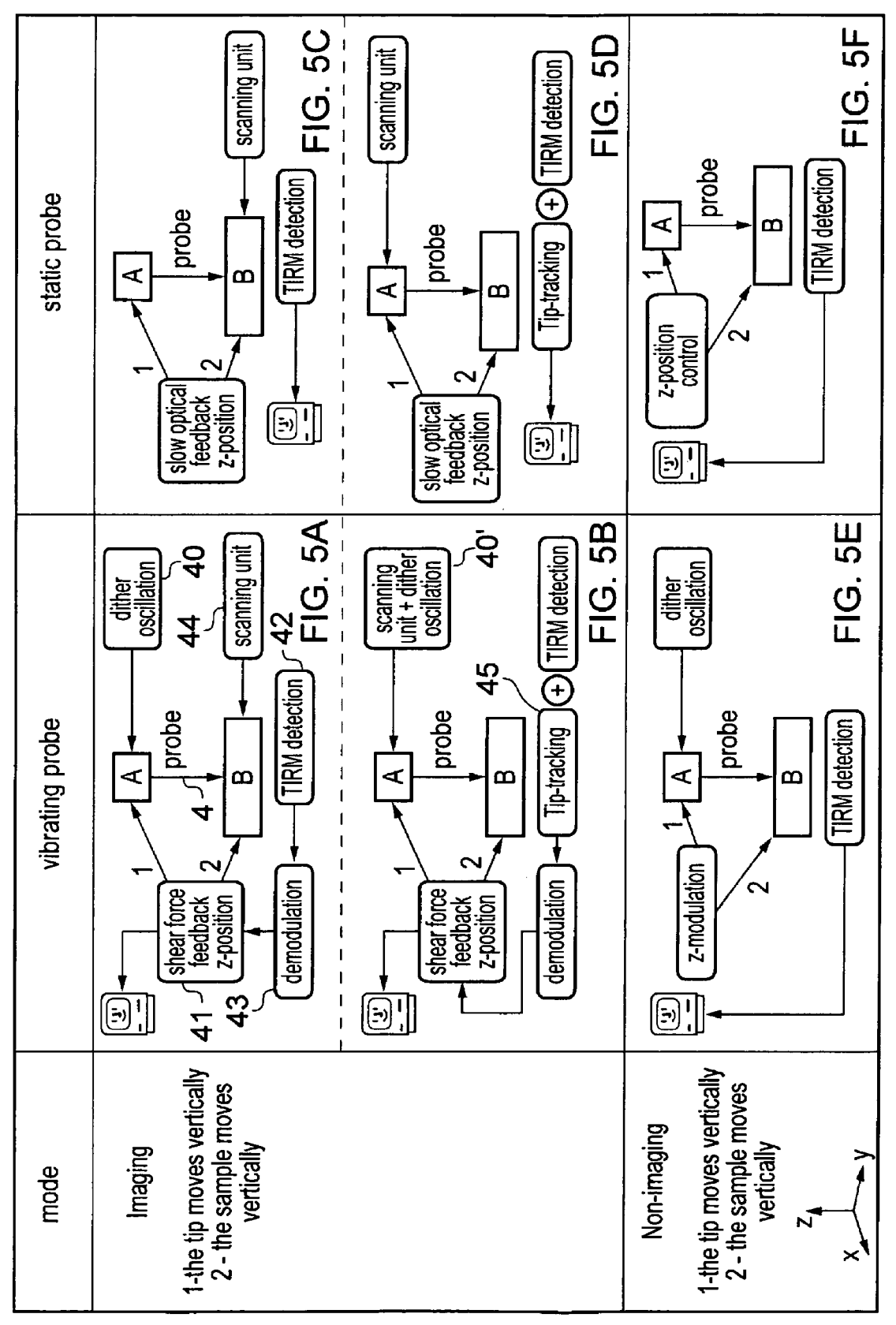

In microscopy imaging mode there are two options: (1) shear force feedback with a vibrating probe (FIGS. 5a and 5b) and (2) non-feedback mode with a static probe (FIGS. 5c and 5d). Using high resonance cantilevers, the first mode can become a non-contact feedback-controlled high-speed scanning mode due to the fact that shear force interaction is a non-contact technique. The second (non-imaging) mode is believed will work using very soft small cantilevers and is conceptually very similar to a conventional contact mode AFM only monitoring in-plane forces. The probe tip is positioned in contact with the sample surface and the in-plane deflection of the cantilever is measured during scanning.

Note that the deflection of the probe results from a resonant flexing motion in which the probe bends along its length. Therefore the movement of the probe tip is, strictly speaking, non-planar. However, the movement of the probe tip in the z-direction is negligible due to the extremely small amplitude of motion.

FIG. 5a shows a first vibrating probe microscope. A probe 4 is attached to a 3-axis piezo-actuator A. The actuator A receives drive signals from a dither oscillation signal generator 40 and from a shear force feedback z-position controller 41. A TIRM detection unit 42 and demodulation unit 43 monitor the position of the probe tip to generate probe tip position data whereby a change in probe tip position data is representative of a characteristic of the sample. A scanning unit 44 scans the sample stage B in a direction substantially parallel with the sample surface with a raster motion. For each new relative position of the sample stage B and the probe tip, new probe tip position data is generated.

FIG. 5b shows a second vibrating probe microscope. The microscope is identical to the microscope of FIG. 5a, except that scanning unit 24 is omitted and tip-tracking unit 45 is added. Also the dither oscillation unit 40 is replaced by a combined dither oscillation and scanning unit 40'. Thus the unit 40' scans the probe 4 in a direction substantially parallel with the sample surface with a raster motion, as well as vibrating the probe with a dither motion. Tip-tracking unit 45 monitors the raster position of the tip.

The microscopy non-imaging mode, referred to in FIGS. 5e and 5f, is also divided into "vibrating probe" and "static probe". The non-imaging, vibrating probe mode measures the oscillation of the probe at different tip-sample separations. This allows, for example, the dynamic response of stretched molecules to be investigated. The measurement of the complex stiffness of a molecule obtained using this technique is described in a technical article by Humphris, A. D. L., et al., *Transverse dynamic force spectroscopy: A novel approach to determining the complex stiffness of a single molecule*. Langmuir, 2002. 18(5): p. 1729-1733, the contents of which is incorporated herein by reference. Additionally, the non-imaging, vibrating probe mode may be used to measure dynamic properties of confined liquids such as lubrication and shear strain/stress relations. In this respect certain useful techniques are described in technical articles by Antognozzi, M., A. D. L. Humphris, and M. J. Miles, *Observation of molecular layering in a confined water film and study of the layers viscoelastic properties*. Applied Physics Letters, 2001. 78(3): p. 300-302; and by Antognozzi, M., et al., *Investigation of nano-confined liquids on muscovite by transverse dynamic force microscopy (TDFM)*. GeoActa, 2003. 2: p. 101-106. The contents of each of these documents is incorporated herein by reference. The thermal fluctuations of a non-driven cantilever can also be considered as a vibrating probe mode.

In the non-imaging, static mode the probe tip is moved close to the sample and kept at a fixed position by using, for example closed loop sensors in the probe position controller. What is measured in this mode is the deflection of the cantilever due to its interaction with a "dynamic" sample. The non-imaging, static mode will make use of very small cantilevers to detect small conformational changes with high force and time resolution. A particularly attractive application will be the study of bio-molecular motors which are proteins that convert chemical energy into mechanical energy in a very efficient way (sometime with an efficiency better than 50%). One reason for studying these motors is that it is believed that they can provide a template for man-made nanoscale motors.

The following Table 1 identifies experimental characteristics of some common bio-molecular motors with respect to time and force resolution necessary to fully characterize their activity.

TABLE 1

| Biomolecular motor | Characteristic time | Force produced |
|---|---|---|
| Restriction enzymes | ~0.1 ms | 1 pN |
| RNA polymerase | ~2 ms | 25 pN |
| DNA polymerase | ~10 ms | 3 pN |
| Muscle myosin | ~0.1 ms | 4 pN |
| Myosin V | ~0.1 ms | 3 pN |

TABLE 1-continued

| Biomolecular motor | Characteristic time | Force produced |
|---|---|---|
| Kinesin | ~0.01 ms | 5 pN |
| Dynein | ~20 ms | 10 pN |
| F1 ATPase | ~5 ms | 20 pN |

Small Cantilevers

Figure 6:
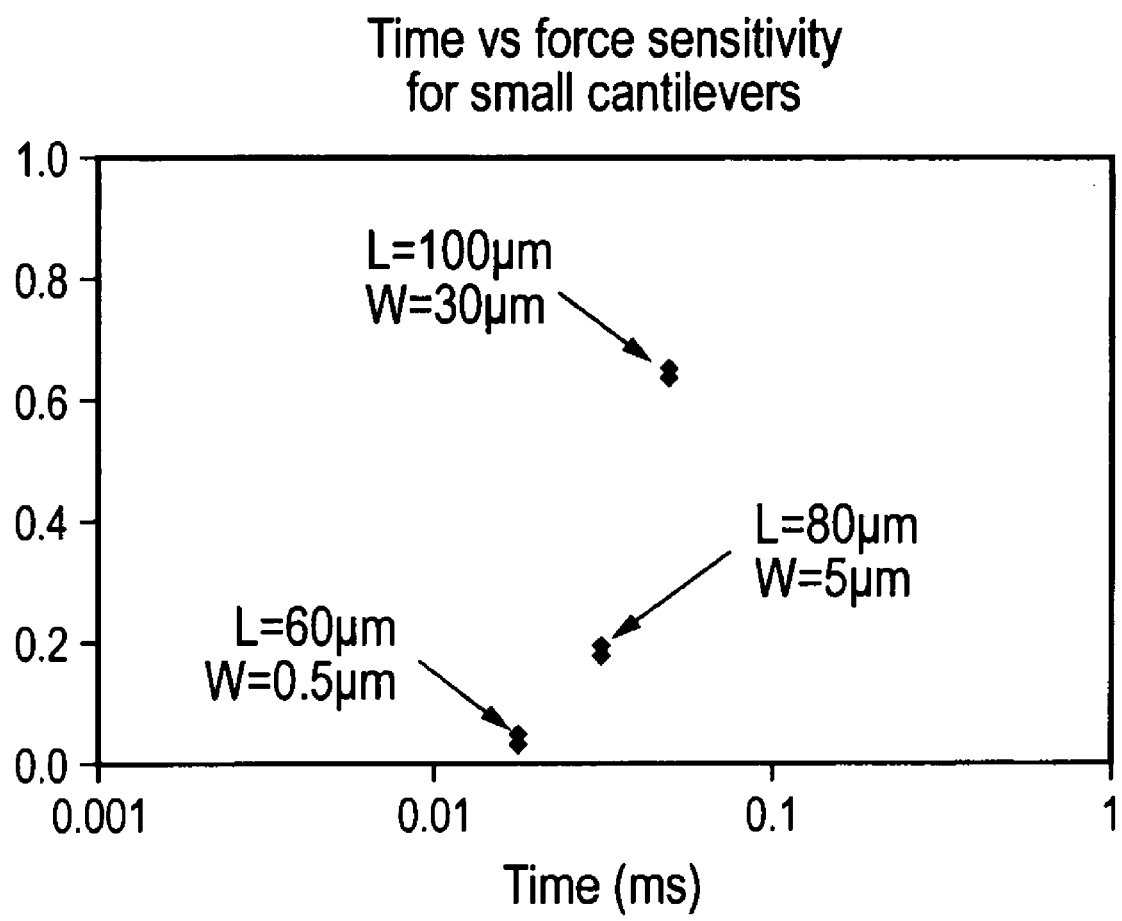
FIG. 6 is a plot illustrating the theoretical force sensitivity against time resolution of three exemplary small cantilevers with length L and width W, the thickness is 180 nm for the three cantilevers.

From the above table it can be seen that the use of conventional micro-fabricated cantilevers would not allow the investigation of these biological systems. The only way to produce mechanical sensors with the correct time and force resolution is by reducing their size. This is illustrated in FIG. 6 for three very small rectangular cantilevers with the same thickness of 180 nm. The graph shows the settling time and minimum detectable force for each cantilever where L identifies the length of the cantilever and W its width.

The minimum detectable force (dF) is defined as dF=kdx, where:

k is the force sensitivity of the cantilever measured in Newtons/meter; and dx is the minimum detectable displacement of the sensor.

Because the minimum detectable displacement is fairly fixed at around 0.1 nm, it is therefore important to use a soft cantilever with a low spring constant (and hence a low force sensitivity).

The settling time defines how quickly the cantilever reaches a new equilibrium state (i.e. position or rms oscillation) from the moment when a disturbance (i.e. an external force) takes place. The settling time t is defined as: $t = Q/w0$ where:

Q is the quality factor of the cantilever; and w0 is the resonant frequency of the cantilever So if a stationary cantilever is excited by a perturbation it will take a time $Q/w0$ to reduce its initial oscillation by $e^{(1/2)}$. A higher resonant frequency will means that the cantilever settles more quickly. Therefore a cantilever with a high resonant frequency and low quality factor is required in order to minimise the settling time t. For microfabricated cantilevers, the quality factor Q is generally fixed, so in order to minimise the settling time t, a high resonant frequency needs to be provided by using a suitably small cantilever.

In summary, in order to minimise the settling time and minimum detectable force, it is preferred to use a small cantilever with a low spring constant. Note that such a small soft cantilever can be used in any of the modes shown in FIGS. 5a-5f. In the vibrating probe modes the actuator A vibrates the probe at its resonant frequency, which is typically greater than 1 MHz and preferably greater than 10 MHz.

To micro-fabricate cantilevers of the dimensions shown in FIG. 6 is not technically challenging, up to sizes of a few hundred nanometers. However, it is difficult to use these probes in conventional atomic force microscopes (AFM) due to their small reflecting surface and the consequent small detection signal. The nearly horizontal orientation of the cantilever is also a problem when using very small cantilevers in conventional AFM due to the strong attractive force with the sample that forces the cantilever tip to adhere to the surface. The probe position monitoring apparatus described in the present invention in combination with vertically mounted cantilevers makes the use of very small cantilevers possible as well as the measurement of the in-plane forces.

A very small cantilever has been produced by the inventors using a focused ion beam (FIB). The cantilever was 70 μm long and 1 μm wide. The resonance frequency (23.4 kHz) of the cantilever was measured using the near-field probe microscope with the probe position monitoring apparatus described above and it agreed with the theoretical value within a 5% error. The spring constant of this cantilever was determined to be 0.5 pN/nm±5% which corresponds to a conservative estimate for the minimum detectable force of at least 0.5 pN, considering that the system can reliably measure displacements of 1 nm.

Conventional cantilevers do not normally terminate with a sharp tip and the only micro-fabricated cantilevers that can be used "out of the box" with good resolution are silicon levers with triangular free ends (also known as "arrow shape"). For these silicon cantilevers the anisotropic etching produces edges that are not straight and the free end terminates approximately in a point. Unfortunately, these levers have a high stiffness (~40 nN/nm) and, ultimately, the success of the method will rely on the ideal properties of ad hoc levers. Table 2 lists the various probes that have been tested so far.

TABLE 2

| Code | Model | Type | Shape | Dimensions | Resonance frequency | Spring constant |
|---|---|---|---|---|---|---|
| A | OBL Biolever Veeco | $Si_3N_4$ | Rectangular | L = 100 μm<br>W = 30 μm<br>T = 0.18 μm | 13 kHz | 0.006 nN/nm |
| B | FIB milled OBL Biolever | $Si_3N_4$ | Rectangular, reduced size to decrease spring constant | L = 68.5 μm<br>W = 0.48 μm<br>T = 0.18 μm | 32 kHz | 0.00017 nN/nm |
| C | FIB milled OBL Biolever | $Si_3N_4$ | Rectangular, reduced size to increase resonant frequency | L = 10.3 μm<br>W = 0.2 μm<br>T = 0.18 μm | 1.8 MHz | 0.05 nN/nm |
| D | Tipless Nanosensors | Si | Rectangular with triangular end | L = 125 μm<br>W = 30 μm<br>T = 4 μm | 340 kHz | 40 nN/nm |
| E | Pulled glass probe | Glass | Cylindrical with tapered end | L = 3 mm<br>R = 0.062 μm | 12 kHz | 1 nN/nm |

In particular, conventional optical fibres (probe E) pulled using the Sutter 2000 puller (Sutter Instruments, USA) were successfully used for conventional shear force microscopy in ambient conditions (data not shown). Probes D are tipless tapping mode cantilevers (from Nanosensors™, Switzerland) and were used to test the evanescent field above a glass surface and to image various samples in shear force microscopy in ambient conditions. The thermal power spectrum density (PSD) was recorded in ambient and liquid conditions using probes B. These levers were modified by a focused ion beam (FIB) from OBL biolever probes (probe A, see Table 2), commercially available from Veeco Instruments Inc., USA. They have reduced dimensions resulting in very soft, highly force sensitive probes (0.17 pN/nm).

Figure 7:
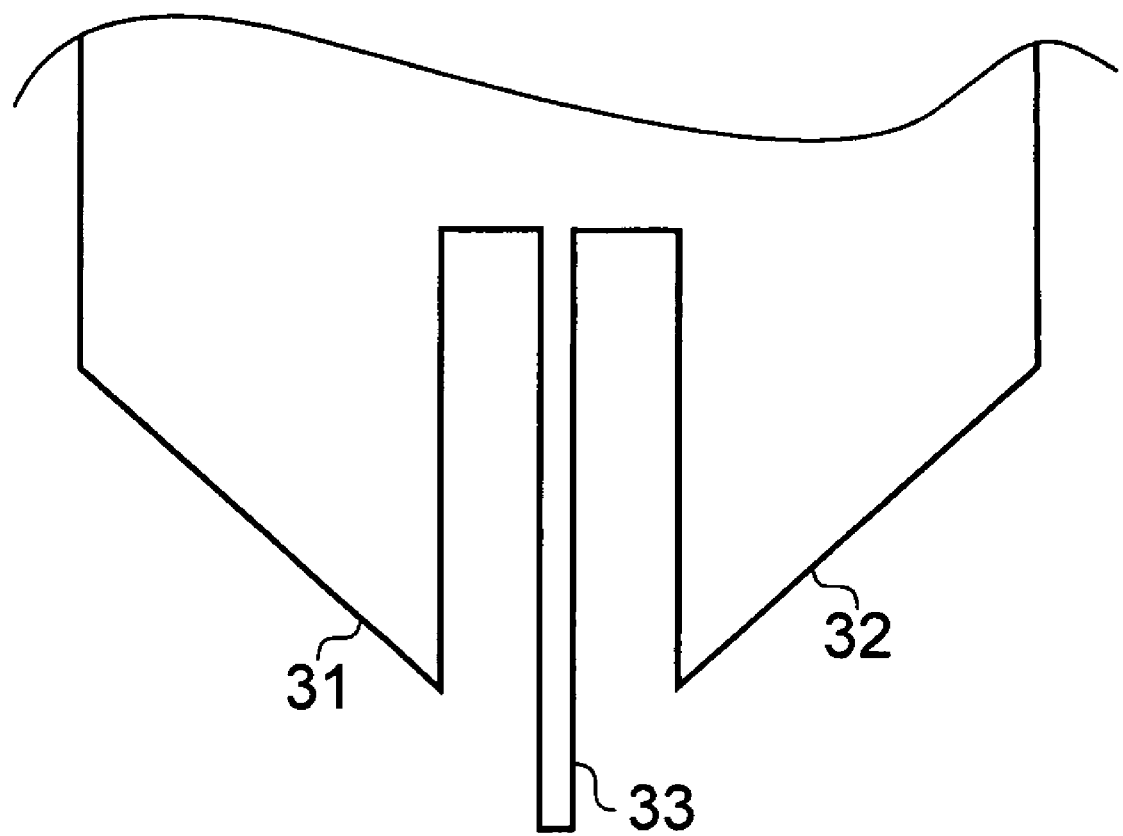
FIG. 7 shows a very small cantilever milled at the end of an OBL biolever.

Finally, a very small force sensor (probe C) shown in FIG. 7 was produced in the FIB, again by milling an OBL biolever probe. The cantilever 33 has a resonance frequency of 1.85 MHz and a spring constant of 37 pN/nm, as calculated from its dimensions. The thickness and the width of the cantilever 33 are comparable (~200 nm). The two arms 31, 32 surrounding the small cantilever 33 are used to optically position the tip in the optical axis of the system.

The natural future applications of these last sensors will be high-speed imaging using shear force feedback.

SUMMARY

From the results and analysis of the data extracted above, it is evident that the use of total internal reflection for directly determining the two dimensional position of the probe tip has a number of advantages, including:

i) The position of the very end of the probe is directly detected in the x and y direction simultaneously.

ii) The size of the cantilever is not critical and so extremely small cantilevers (less than 1 μm long and/or wide and/or thick) can be detected. Note that the probe is elongate, and in general the length of the cantilever (that is, its maximum dimension) may be oriented at any angle between 45° and 90° to the sample surface in order to measure in-plane forces, but preferably the length is generally oriented at substantially 90° to the sample surface (for instance between 85° and 90°).

iii) The force sensitivity of the cantilever (in the plane of the sample) is not limited by adhesion effects because the vertical geometry ensures very high vertical stiffness of the cantilever.

iv) Imaging in water does not interfere with the probe monitoring system, as it does in the case of the conventional optical detection methods. The only difference between working in air and in water with total internal reflection illumination is the increase in the decay length of the evanescent field above the sample surface.

Although the probe position monitoring system has been presented here in combination with a particular optical arrangement, a high numerical aperture lens combined with a tube lens, alternative solutions are envisaged without departing from the invention. For example, the beam splitters 20,23 shown in FIG. 2 can be replaced by dichroic mirrors and the tube lens 9 can be replaced by a system of lenses to control the size and intensity of the image of the probe tip. Furthermore, the high numerical objective lens 8 can be replaced by a prism to produce the total internal reflection of the light source at the interface boundary.

Moreover, although reference has been made herein to a single probe, the method and apparatus may also be used to determine the positions of probe tips of an array of probes where all the probe tips rest in a common probe tip plane. Where an array of probes is being used to generate sample data, a CCD camera is used as the detector with a plurality of individually selectable regions of interest (ROI). Computer software, able to calculate the spatial intensity distribution of each ROI, is then used to determine the (x,y) position in the probe tip plane of each individual probe tip in real-time.

Although reference has been made herein to the use of the probe position monitoring apparatus being used as part of a near-field microscopy system, the probe position monitoring apparatus may also be used as part of a lithographic system for applying patterning to a sample surface for example by etching or other types of conformational changes.

The invention claimed is:

1. A method of determining the position of a tip of a probe comprising: generating an evanescent electromagnetic field extending beyond an interface boundary between a first medium, having a first refractive index, and a second medium, having a second refractive index which is greater than the first refractive index, the interface boundary extending in a plane; positioning a probe tip in the evanescent field in the first medium thereby causing propagating electromagnetic radiation to be produced as a result of the disruption of the evanescent field by the probe tip; and collecting at least a portion of the propagating electromagnetic radiation, detecting the spatial intensity distribution of the collected radiation with respect to an image plane; and determining from the detected spatial intensity distribution an at least one dimensional position of the probe tip in a probe tip plane, the probe tip plane being a plane which contains the probe tip and which is substantially parallel to the plane of the interface boundary, wherein the position of the probe tip is determined as the probe bends along its length and the probe tip moves in the probe tip plane.

2. A method as claimed in claim 1, wherein the collected propagating radiation is projected onto the image plane conjugated with respect to the probe tip plane.

3. A method as claimed in claim 1, wherein the detected spatial intensity distribution is detected using a spatially discriminating detector.

4. A method as claimed in claim 1, wherein the evanescent field is generated in the first medium by directing an excitation beam of radiation at the interface boundary through the second medium at an angle greater than the critical angle for internal reflection.

5. Probe position monitoring apparatus for determining the position of a tip of a probe, comprising: a sample support for defining an interface boundary between a first medium, having a first refractive index, and a second medium, having a second refractive index which is greater than the first refractive index, the interface boundary extending in a plane; excitation means for generating an evanescent electromagnetic field extending beyond said interface boundary in the first medium; and radiation collection means for collecting at least a portion of the propagating electromagnetic radiation arising from disruption of the evanescent field by the presence of the probe tip within the evanescent field and for directing the collected propagating electromagnetic radiation onto a detector, wherein the detector is aligned with an image plane and is adapted to detect the spatial intensity distribution of the collected propagating radiation at the image plane; and the probe positioning monitoring apparatus further comprises a processor, in communication with an output of the detector, for determining an at least one dimensional position of the probe tip in a probe tip plane on the basis of the spatial intensity distribution of the detected radiation, the probe tip plane being a plane which contains the probe tip and which is substantially parallel to the plane of the interface boundary, and wherein the probe is oriented so that the probe bends along its length as the probe tip moves in the probe tip plane.

6. Apparatus as claimed in claim 5, wherein the radiation collection means is adapted to project collected radiation onto the image plane conjugated with respect to the probe tip plane.

7. Apparatus as claimed in claim 5, wherein the detector is a spatially discriminating detector.

8. Apparatus as claimed in claim 5, further comprising an excitation beam directed at the interface boundary through the second medium at an angle greater than the critical angle.

9. Probe position monitoring apparatus as claimed in claim 5 adapted to determine the positions of the probe tips in a common probe tip plane of a plurality of probes in an array wherein the detector is adapted to record the spatial intensity distribution of the collected propagating electromagnetic radiation arising from disruption of the evanescent field by the presence of multiple probe tips within the evanescent field and the processor is adapted to determine from the spatial intensity distribution of the collected propagating electromagnetic radiation produced by the multiple probe tips the position of each individual probe tip.

10. A near-field probe microscopy method for collecting sample data, the microscopy method comprising: providing a sample on a sample stage; generating an evanescent electromagnetic field extending beyond an interface boundary between a first medium, having a first refractive index, and a second medium, having a second refractive index which is greater than the first refractive index, the interface boundary extending in the plane of the sample stage; positioning the probe tip of a probe in the evanescent electromagnetic field in a near-field region above the sample surface; and monitoring the position of the probe tip using the method as claimed in claim 1 to generate probe tip position data, whereby a change in the probe tip position data is representative of a characteristic of the sample.

11. A near-field probe microscopy method as claimed in claim 10, further comprising changing at least once the relative position of the sample and the probe tip in the probe tip plane to a new relative position; and generating new probe tip position data for each new relative position.

12. Near-field microscopy apparatus comprising a sample stage, a probe, and probe position monitoring apparatus as claimed in claim 5.

13. A method of patterning the surface of a sample comprising the steps of: providing a sample on a sample stage; generating an evanescent electromagnetic field extending beyond an interface boundary between a first medium, having a first refractive index, and a second medium, having a second refractive index which is greater than the first refractive index, the interface boundary extending in the plane of the sample stage; positioning the probe tip of a probe in the evanescent electromagnetic field in a near-field region above the sample surface in a first probe position relative to the sample; monitoring the position of the probe tip using the method as claimed in claim 1 to generate probe tip position data; changing a characteristic of the surface of the sample locally by means of the probe tip; causing relative movement of the probe and the sample to at least one new probe position and selectively changing a characteristic of the surface of the sample locally at each new probe position so as to producing patterning of the surface of the sample.

14. A near-field microscopy apparatus comprising a sample stage, a probe and probe control means for apply patterning to a sample by means of the probe, the near-field microscopy apparatus further comprising probe position monitoring apparatus as claimed in claim 5.

15. The method of claim 1, wherein the probe is sufficiently small and soft to enable a force on the probe tip which is lower than 1 pN, and more preferably lower than 0.5 pN, to generate a change in the probe tip position data with a settling time lower than 1 ms, and more preferably lower than 0.1 ms.

16. The method of claim 1, wherein the probe is less than 1 μm long and/or wide and/or thick.

17. The method of claim 1, wherein the probe has a resonant frequency in air which is greater than 20 kHz, preferably greater than 1 MHz, and more preferably greater than 10 MHz.

18. The method of claim 1 further comprising causing the probe to flex at a frequency greater than 20 kHz, preferably greater than 1 MHz, and more preferably greater than 10 MHz.

19. The method of claim 1 wherein the probe has a spring constant less than 10 pN/nm, and preferably less than 1 pN/nm.

20. The method of claim 4 wherein a portion of the excitation beam of radiation, before or after reflection at the interface boundary, is combined with the collected propagating radiation.

21. The method of claim 20 wherein the detected spatial intensity distribution is detected using a spatially discriminating detector and a portion of the excitation beam of radiation, before or after reflection at the interface boundary, is combined with the collected propagating radiation to generate an interference pattern which is projected onto the detector.

22. The method of claim 20 wherein the detected spatial intensity distribution is detected using a spatially discriminating detector and a portion of the excitation beam of radiation, before reflection at the interface boundary, is combined with the collected propagating radiation to generate an interference pattern which is projected onto the detector.

23. The method of claim 20 wherein a portion of the excitation beam of radiation, before reflection at the interface boundary, is combined with the collected propagating radiation.

24. The apparatus of claim 5 further comprising an optical system to direct an excitation beam at the interface boundary through the second medium at an angle greater than the critical angle; and optical means for combining a portion of the excitation beam, before or after reflection at the interface boundary, with the collected propagating radiation.

25. The apparatus of claim 24 wherein the detector is a spatially discriminating detector and the optical means generates an interference pattern which is projected onto the detector.

26. The apparatus of claim 24 wherein the optical means combines a portion of the excitation beam, before reflection at the interface boundary, with the collected propagating radiation.

27. The apparatus of claim 5, wherein the probe is sufficiently small and soft to enable a force on the probe tip which is lower than 1 pN, and more preferably lower than 0.5 pN, to generate a change in the probe tip position data with a settling time lower than 1 ms, and more preferably lower than 0.1 ms.

28. The apparatus of claim 5, wherein the probe is less than 1 μm long and/or wide and/or thick.

29. The apparatus of claim 5 wherein the probe has a resonant frequency in air which is greater than 20 kHz, preferably greater than 1 MHz, and more preferably greater than 10 MHz.

30. The apparatus of claim 5 wherein the probe has a spring constant less than 10 pN/nm, and preferably less than 1 pN/nm.

* * * * *